April 23, 1963  S. C. ROCKAFELLOW  3,087,047
PRECHARGING CAPACITOR FOR PULSE POWER
Filed Aug. 1, 1960
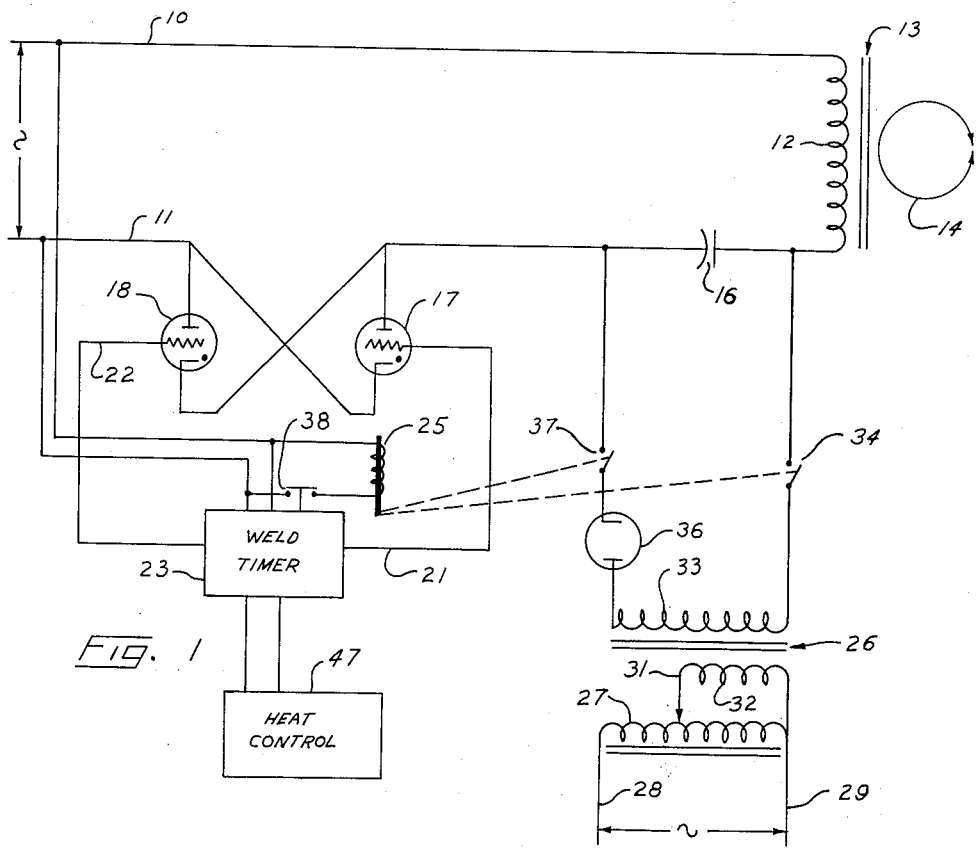
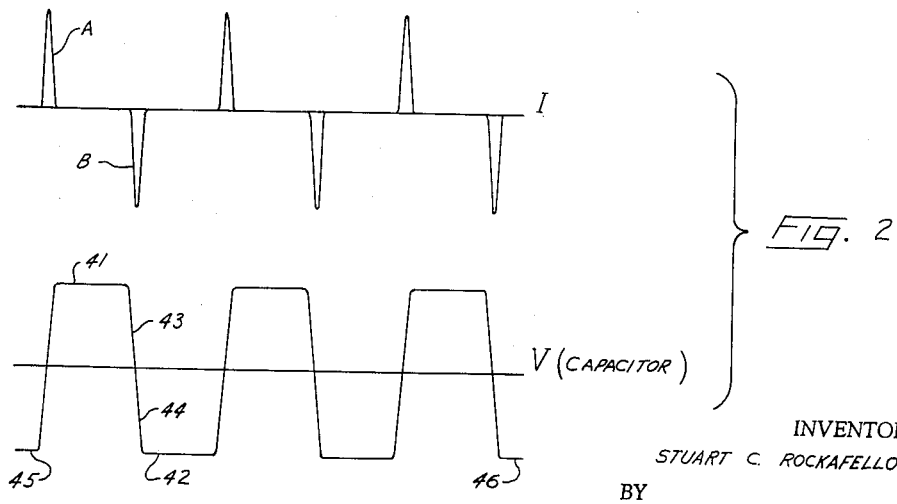
INVENTOR.
STUART C. ROCKAFELLOW
BY
Woodhams Blanchard & Flynn
ATTORNEYS

United States Patent Office 3,087,047
Patented Apr. 23, 1963

3,087,047
PRECHARGING CAPACITOR FOR PULSE POWER
Stuart C. Rockafellow, Plymouth, Mich., assignor to Robotron Corporation, Detroit, Mich., a corporation of Michigan
Filed Aug. 1, 1960, Ser. No. 46,847
3 Claims. (Cl. 219—114)

This invention relates to an electric circuit for supplying a load with high amperage, short duration pulses of alternating polarity from an alternating potential source and, more particularly, relates to an electrical circuit in which each of the pulses has the same amplitude. This application is a continuation-in-part of application Serial No. 22,822, filed April 18, 1960, which in turn is a continuation-in-part of application Serial No. 842,451, filed September 25, 1959, now abandoned, which in turn is a continuation-in-part of application Serial No. 763,725, filed September 26, 1958, now abandoned.

In the first-mentioned copending application, there is disclosed a circuit for supplying welding current in the form of short duration, high amperage pulses of alternating polarity, particularly intended for supplying current to the primary winding of a welding transformer. The reasons for and the advantages of this circuit are described in the first-mentioned application and reference should be made thereto for a more complete statement thereof.

The system disclosed in the afore-mentioned application employs a capacitor which is connected in series with an inductance and with switch means to an alternating potential source. The circuit operates in such fashion that the capacitor discharges from a previously charged condition and is then charged in the opposite polarity during each half-cycle of the alternating potential source. A pulse of energy is supplied to the load while the capacitor is discharging and then charging and at least a portion of this energy is derived from the capacitor. It frequently happens that the first pulse of a given weld cycle has a smaller amplitude than the succeeding pulses of the same cycle due to the fact that the capacitor may have at least in part been partially discharged during the time interval between weld cycles. This causes the amplitude of the pulses to increase so that there is an upslope in the weld pulse pattern. However, it is frequently necessary that each weld pulse be of the same amplitude as all other pulses of the same weld cycle so that the energy supplied in each weld pulse will be the same and an upslope in the weld pulse pattern cannot be tolerated.

In attempting to solve this problem, recognition must be taken of the fact that present weld timing devices which control the starting and stopping of the flow of pulses always start on a positive half-cycle of the alternating potential source and end on a negative half-cycle. Thus, the pulses fed through the load begin with a plus pulse and end with a minus pulse. In operation of the afore-mentioned circuit, after a positive pulse is fed through the load, the capacitor is left charged negatively and vice versa. Therefore, in order to insure that the capacitor has the same charge thereon for the first pulse as for all succeeding pulses of a given weld cycle, it is necessary that the capacitor be charged negatively before the first pulse is transmitted to the load. Thus, the invention is intended to provide circuitry for insuring that the capacitor always has a controlled charge thereon in the negative direction before pulses start to flow so that the first pulse of energy fed through the load will be of the same amplitude as succeeding pulses.

Accordingly, it is an object of the invention to provide an improved pulse-supplying circuit in which all of the pulses have the same amplitude.

It is a further object of the invention to provide an improved pulse-supplying circuit, as aforesaid, in which a precharging circuit is provided to insure that the capacitor is precharged to a value sufficient to give the same pulse amplitude for the first pulse of a given weld cycle as for succeeding pulses in the same weld cycle.

It is a further object of the invention to provide an improved pulse-supplying circuit, as aforesaid, in which the precharging circuitry is automatically disconnected from the pulse-generating circuit before the first pulse is caused to flow.

It is a further object of the invention to provide an improved pulse-supplying circuit which is relatively simple and made of inexpensive, readily available components so that it is relatively inexpensive to provide and maintain and is reliable and effective in operation.

Other objects and purposes of the invention will be apparent to persons acquainted with equipment of this type upon reading the following disclosure and inspecting the accompanying drawings.

In the drawings:

FIGURE 1 is a circuit diagram of a circuit embodying the invention.

FIGURE 2 is a time versus current and charge diagram illustrating the relationship between the charge on the capacitor and the pulses flowing through the load.

General Description

In general, the invention provides a circuit which includes a source of alternating potential and switch means, such as a pair of thyratrons, a capacitor and an inductance connected in series with each other and to said source. The switch means is rendered conductive during successive half-cycles of the source so that the capacitor in a charged condition may discharge through the load and then be charged in the opposite polarity during each half-cycle of the source. In this manner pulses of alternating polarity are supplied to the load, there being one pulse during each half-cycle of the source. Particularly, the invention provides an improvement in the aforesaid circuitry for insuring that the capacitor is charged to the desired level before the switch means is rendered conductive which improvement comprises a separate charging circuit for charging the capacitor when the switch means are in nonconductive condition together with means for disconnecting the charging circuit from the capacitor when the switch means are conductive.

Detailed Description

Referring now to FIGURE 1 of the drawings, there is provided a pair of conductors 10 and 11 which are connected to any convenient source of alternating potential, such as ordinary 60-cycle commercial A.C. source. The conductor 10 is connected to one end of a primary winding 12 of a welding transformer 13. The other end of the primary winding 12 is connected to one side of a capacitor 16. A secondary winding 14 of the welding transformer 13 is connected to the welding electrodes in a conventional manner. The other side of capacitor 16 is connected to the anode of one electric switch 17 and is connected to the cathode of another electric switch 18. The electric switches 17 and 18 are here shown as being thyratrons. The cathode of switch 17 and the anode of switch 18 are connected to the other line conductor 11. The control electrodes of the switches 17 and 18 are connected by conductors 21 and 22, respectively, to a suitable weld timer circuit 23. The weld timer circuit will control the usual functions of the squeeze, weld, hold and off and will supply potential to enable switches 17 and 18 to become conductive when it is desired to have weld current flow. The weld timer may be of any conventional type and make and, for example, may be the same as that shown in my U.S. Patent No. 2,776,383.

An adjustable heat control circuit 47 is connected to the weld timing circuit 23 for adjusting the delay in firing the switches 17 and 18 with respect to the beginning of the half-cycles of the source to thereby adjust the energy supplied to the load.

The circuitry thus far described is substantially the same as that disclosed in my afore-mentioned application and this circuitry does not, per se, form the invention subject matter of this application. However, it is an essential part of the subject matter of the invention. It should also be noted that the invention is intended for use where the parameters of the above-described portion of the circuit are selected so that K is between 1 and 2, preferably between 1.33–1.7 based on equivalent circuit values. The value of K is determined from the formula $$K = 1 + e^{-\frac{\pi R}{2}\sqrt{\frac{C}{L}}}$$

where R, L and C are the equivalent circuit values of the resistance, inductance, and capacitance of the above-described circuit. This is discussed in greater detail in my afore-mentioned application and reference should be made thereto for a more complete statement thereof.

Referring now to the novl circuitry which cooperates with the above-identified pulse-supplying circuitry, a variable transformer 26 has a primary winding 27 connected by the conductors 28 and 29 to a suitable source of alternating potential, which is in phase with the source which supplies conductors 10 and 11. Where ordinary commercially available 60-cycle A.C. source is utilized, the conductors 10 and 11 and conductors 28 and 29 may be connected to the same source. A slider 31 is movable along the winding 27 and connected to one end of a further winding 32 so as to permit adjustment of the total number of turns which function as the primary winding of the transformer 26. One end of the secondary winding 33 of the transformer 26 is connected through normally closed switch contacts 34 to one side of capacitor 16. The other end of secondary winding 33 is connected through a rectifier 36, which is here shown as a diode, through a further set of normally closed contacts 37 to the opposite side of the capacitor 16. Thus, when a transformer 26 is energized and the contacts 34 and 37 are in their normal closed position as shown in the FIGURE 1, half wave rectified A.C. will be supplied to the capacitor 16 to charge same in one polarity. When the contacts 34 and 37 are open, the transformer 26 is disconnected from the capacitor 16. The contacts 34 and 37 are operated by suitable means, such as a relay winding 25, operated by a switch in the weld timer 23 so that they are opened at the beginning of, or during, the squeeze portion of the weld cycle and remain open during flow of welding current. For example, the weld timer may include a switch having normally open contacts 38 which are closed at the desired moment in any convenient manner.

*Operation*

While the operation of the circuitry has been somewhat indicated above, and the operation of the basic pulse supplying circuit is set forth in detail in the above-mentioned application, it will be briefly repeated for the purpose of insuring a complete understanding of the invention.

With line 10 positive with respect to line 11 and switch 17 conductive, current will flow through the primary winding 12 and charge the capacitor 16, the other side of the capacitor being connected through the conductive switch 17 to the other conductor 11. This flow will continue until the capacitor 16 is fully charged at which time the flow will stop. This will supply one pulse A of energy to the load. When conductor 11 becomes positive with respect to conductor 10 and the switch 18 is conductive, current will flow from the conductor 11 through the switch 18 to the capacitor 16 and from the capacitor through the primary winding 12 of the welding transformer and back to the conductor 10. This supplies one pulse B of the opposite polarity to the load. Such reverse flow of current through the capacitor 16 will first discharge said capacitor from its previously charged condition indicated by line 41 and then recharge it in the opposite direction to the condition indicated by line 42. The discharging is indicated in FIGURE 2 by the line 43 and the recharging in the opposite polarity is indicated by the line 44. At the time of the second pulse, the charge on the capacitor 16 will be added to the potential between the conductors 10 and 11 to apply a potential greater than line voltage across the primary winding 12. This would also be greater than appears in the first pulse A above described if the precharging circuit of the invention were not present. This increased potential applied to the primary winding will be repeated with each succeeding pulse as long as the pulses appear close enough together that the capacitor 16 remains charged from one pulse to the next. In addition, as set forth in the first-mentioned application, the high rate of charging and discharging the capacitor tends to generate further voltage across the winding 12 whereby the pulses supplied to the primary winding are of more than twice the voltage of the external source. This is a function, among other things as fully explained in the first-mentioned application, of the duration of the pulse which in a typical embodiment is one millisecond in length.

It will be observed that the switch 17 is described above as being the first one to be made conductive. Present conventional practice in the welding control art is to start the flow of weld current on the half-cycle in which the conductor 10 is positive with respect to conductor 11 and to terminate flow of welding current on the half-cycle when the conductor 11 is positive to conductor 10.

Now turning to the operation of the improved circuitry, it wil be observed that the foregoing description has referred to an operation where, for the first pulse, the capacitor 16 was not charged and therefore the same amount of energy could not flow through the winding 12 as flowed in the succeeding pulses. The invention is intended for precharging the capacitor 16 so that it will have the same value of charge for the first pulse as for all succeeding pulses so that the pulses will be of the same amplitude. Therefore, the invention is intended to insure that the capacitor 16 has a charge thereon indicated by the line 45 in FIGURE 2, which charge is below the zero axis as compared with the first pulse 43 which flows through the primary winding.

Before weld current flows, the capacitor 16 is charged by energization of the transformer 26 which supplies through the rectifier 36 half wave rectified A.C. potential so that said capacitor is charged downwardly as appearing in FIGURE 2. The contacts 34 and 37 are closed during such charging of the capacitor 16. However, the contacts 37 and 34 are opened by the relay 25 in the weld timer circuit, which relay may be operated at the beginning of the squeeze time for the weld cycle. Thus, the capacitor 16 will be charged until the squeeze time of the weld cycle begins and then the contacts 34 and 37 will be opened and the charging of the capacitor 16 from the transformer 26 will be terminated. Consequently, the charging circuit will be disconnected from the pulse-supplying circuit during welding. However, as soon as the welding cycle is over, the relay 25 may be deenergized to permit the contacts 34 and 37 to close to thereupon cause recharging of the capacitor 16. Whether this will be necessary depends on the time interval between successive weld cycles since the final pulse of weld current in any given weld cycle will leave the capacitor 16 charged negatively as indicated by line 46 and if the succeeding weld cycle follows closely enough, no further precharging of the capacitor will be needed. However, if the charge is not maintained constant, then the charging circuit may be connected to the capacitor 16 and effect the precharging thereof as described above.

The transformer 26 can be adjusted by movement of slider 31 along winding 27 as may be required so that the precharging of the capacitor 16 will be effected at such a value that the same pulse amplitude will be achieved for the first pulse as is achieved for the succeeding pulses.

The switches 17 and 18 are shown as being thyratrons since they may be satisfactorily used where relatively low currents must pass therethrough. However, if higher currents are involved the switches may be ignitrons whose firing is controlled by thyratrons.

While a particular preferred embodiment of the invention has been described above, the invention contemplates such modifications or changes therein as lie within the scope of the appended claims.

What is claimed is:

1. A circuit for supplying pulses of energy to welding electrodes, comprising: a source of alternating potential; a welding transformer having a primary winding and having a secondary winding connected to welding electrodes; a pair of back-to-back connected electric valves having control electrodes; a capacitor, said capacitor, said valves and said primary winding being connected in series with each other; weld timer means connected to said control electrodes for rendering said valves conductive on opposite half-cycles of said alternating source; a variable transformer having a secondary winding, one of whose ends is connected through a rectifier and a switch to one side of said capacitor, the other end of said secondary winding being connected through a further switch to the other side of said capacitor; means in said weld timer means for opening said switches before said valves are rendered conductive whereby said variable transformer and said rectifier charge said capacitor in one polarity before said valves are rendered conductive so that the first pulse through said primary winding will have the same amplitude as succeeding pulses.

2. A circuit for supplying pulses of energy to a load, comprising: a source of alternating potential; switch means, a capacitor, a resistance and an inductance all connected in series circuit with each other and connected for supplying energy to the load; timing means for rendering said switch means conductive for a predetermined period of time so that said capacitor in a charged condition may discharge during successive half-cycles of said source through the load and be charged in the opposite polarity during each half-cycle of said source; charging means separate from said series circuit for charging said capacitor; further switch means between said charging means and said capacitor; and means operable by said timing means for operating said further switch means whereby said capacitor is charged by said charging means when the first-named switch means are nonconductive and is not charged by said charging means when said first-named switch means are conductive.

3. A circuit according to claim 2 in which the parameters of the series circuit comprising the source, the first-named switch means, the capacitor, the resistance and the inductance conform substantially to the formula:

$$K = 1 + e^{-\frac{\pi R}{2}\sqrt{\frac{C}{L}}}$$

wherein $e$ equals the natural logarithmic base, R equals the total resistance in all resistive components of the above-designated series circuit, C equals the total capacitance in all capacitive components of the above-designated series circuit, L equals the total inductance in all inductive components of the above-designated series circuit and wherein K is of a value between the integer 1 and the integer 2.

References Cited in the file of this patent

UNITED STATES PATENTS 2,256,209   Levoy _____ Sept. 16, 1941